United States Patent [19]

Ogrodski

[11] Patent Number: 4,799,259
[45] Date of Patent: Jan. 17, 1989

[54] MONOLITHIC RANDOM DIGITAL NOISE GENERATOR

[75] Inventor: Albert V. Ogrodski, Anaheim, Calif.

[73] Assignee: Rockwell International Corporation, El Segundo, Calif.

[21] Appl. No.: 850,202

[22] Filed: Apr. 10, 1986

[51] Int. Cl.[4] .................. H04L 9/04; H03B 29/00
[52] U.S. Cl. ........................... 380/46; 331/78; 364/717
[58] Field of Search ............ 364/717; 331/78; 380/50, 46

[56] References Cited

U.S. PATENT DOCUMENTS

| | | | |
|---|---|---|---|
| 3,311,884 | 3/1967 | Mengel | 380/46 |
| 3,366,779 | 1/1968 | Catherall et al. | 331/78 |
| 3,639,690 | 2/1972 | Brann et al. | 380/50 |
| 3,780,213 | 12/1973 | Harna | 331/78 |
| 4,142,240 | 2/1979 | Ward et al. | 331/78 |
| 4,213,101 | 7/1980 | Policand et al. | 331/78 |
| 4,409,434 | 10/1983 | Basset et al. | 380/50 |
| 4,450,321 | 5/1984 | Quigley et al. | 364/717 |
| 4,673,871 | 6/1987 | Brown et al. | 331/78 |

*Primary Examiner*—Salvatore Cangialosi
*Attorney, Agent, or Firm*—H. Frederick Hamann; George A. Montanye; James F. Kirk

[57] ABSTRACT

A random digital signal generator circuit responsive to a clock signal from a block signal source for outputting a sequential series of logic signals. The circuit comprises a clocked flip-flop that provides a signal at its output terminal that has a value corresponding to the state of its input signal until a subsequent clock signal is received. An array of oscillator signal generators is provided with each oscillator signal generator operating at a different frequency. An EXCLUSIVE-OR network means having an array of input terminals has each input terminal of the EXCLUSIVE-OR network coupled to the output terminal of a corresponding oscillator signal generator. The EXCLUSIVE-OR network provides a random output signal at its output terminal. The EXCLUSIVE-OR network means output terminal is coupled to the flip-flop input terminal. The flip-flop responds to each the clock signal to sample the state of the random output signal from the EXCLUSIVE-OR network. The flip-flop stores and couples the state of the random output signal to the flip-flop output terminal with each successive clock signal.

17 Claims, 7 Drawing Sheets

MONOLITHIC RANDOM DIGITAL NOISE GENERATOR

BACKGROUND OF THE INVENTION

1. Field of the Invention

This invention relates to integrated circuits and particularly to metal oxide semiconductor large scale integrated circuit (MOS/LSI) devices having N-channel or P-channel MOS field effect transistors such as are commonly used in calculators, home and office computers, automotive and industrial control systems, security systems, cryptographic systems, games and other commercial products. MOS/LSI devices use numerous circuit designs to achieve specific functions. One of the circuit designs used in MOS/LSI devices is a random number generator which provides a series of random digital numbers having a predetermined range. An ideal random digital number generator provides a series of digital numbers in which each number having a value within a predetermined range appears in random fashion with equal probability. The invention circuit provides this property and is particularly suitable for manufacture by standard integrated circuit processing steps.

2. Description of Prior Art

The most common random digital number generator uses a special semiconductor, such as a forward biasing diode or a back based zener diode. The output signal from the biased semiconductor device is amplified and fed to a limiter circuit. The noise property of the biased device makes the time at which the signal from the limiter translates from a first logic level to a second logic level intermediate. The interval during which the output of the limiter circuit remains in a first state or in a second state is therefore indeterminate. The output of the limiter is sampled by a clocked flip-flop, and the output of the flip-flop then represents the desired random digital signal.

The prior art circuit described is bandwidth limited by the properties of the selected biased semiconductor. The biased semiconductor is typically a special device and since the commercial demand for these devices is low, their availability is limited, and their price is high.

In addition, random digital number generator circuits that rely on the noise property of a biased semiconductor are typically sensitive to temperature and process variations, as well as periodic noise capable of locking the output noise property of the biased semiconductor to a particular periodic rate.

SUMMARY OF THE INVENTION

It is therefore a major objective of this invention to provide a random digital signal generator circuit for use in MOS/LSI devices, using relatively few components and providing a clocked output signal in response to a clock signal.

Another objective of this invention is to provide a random digital signal generator circuit that is relatively insensitive to both temperature variations and local circuit noise.

Another objective of this invention is to provide a random digital signal generator circuit that is compatible with manufacturing techniques used in MOS/LSI circuit processes.

These and other objectives of the invention are realized in a random digital signal generator circuit adapted to operate between a single voltage source, such as a 5 V source and a reference potential, such as ground.

DESCRIPTION OF THE PREFERRED EMBODIMENT

Figures 1, 2, 2A:
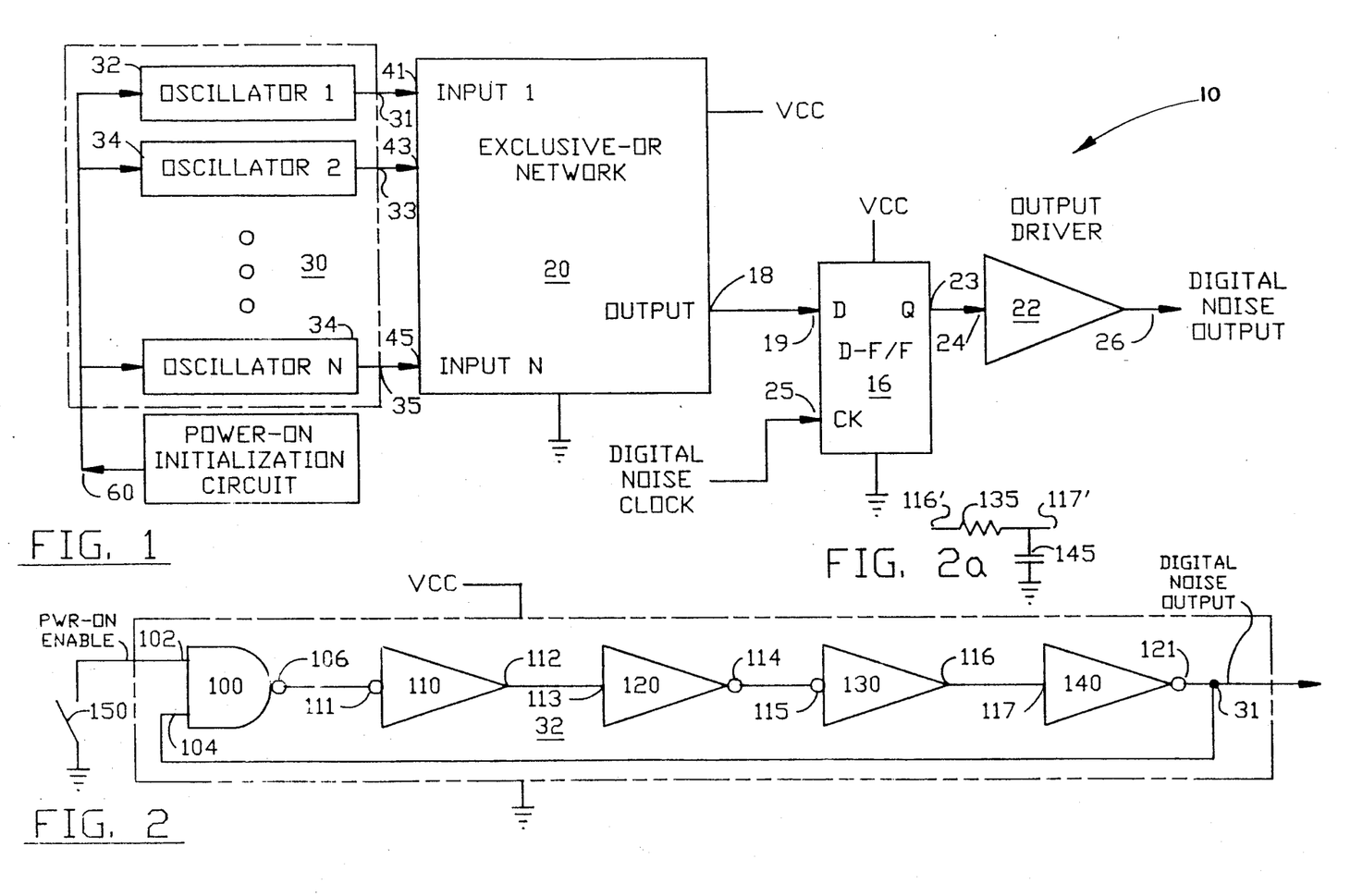
FIG. 1 is a block diagram of the invention random digital signal generator circuit.
FIG. 2 is a logic diagram of a ring oscillator.

In accordance with the present invention, FIG. 1 is a block diagram illustration of the invention random digital signal generator circuit 10 adapted to operate between voltage source VCC and reference potential, such as ground 12.

Flip-flop 16 is a conventional D-F/F (delay flip-flop) having an input D, an output terminal Q and a clock terminal CK. EXCLUSIVE-OR network 20 has output terminal 18 coupled to D-F/F input terminal 19. An array of oscillators is represented within phantom block 30 by blocks 32, 34 etc., each oscillator having a respective output terminal 31, 33, 35.

The flip-flop 16 clock signal input CK receives a clock signal titled DIGITAL NOISE CLOCK. The DIGITAL NOISE CLOCK is a clock signal provided by the system in which the random digital signal generator circuit 10 is used. T clock signal is typically a typical D-F/F devices can be purchased to recognize only the positive edge or the negative edge of a clock signal provided to the clock signal input CK. A commercial part suitable for this application and for use with a VCC supply of 5 V is an SN74AS74.

The flip-flop stores the state of the signal at the flip-flop input terminal 19 and maintains an output at the output terminal Q, 23 corresponding to the state of the input signal concurrent with the clock signal, or the clock signal transition from a low to a high or a high to a low, depending on the type of flip-flop used. The output signal level at the flip-flop terminal Q 23 remains unchanged until a subsequent clock signal is received at the CK terminal.

The EXCLUSIVE-OR network means 20 has an array of input terminals 41, 43, 45. Each input terminal is coupled to the output terminal of a corresponding oscillator, such as 31, 33, 35. The EXCLUSIVE-OR network 20 provides a random output signal at output terminal 18 which is coupled to the flip-flop input terminal 19. The array of oscillator signal generators within phantom block 30 each operate at a different frequency. Each oscillator provides a periodic output signal at its respective output terminal. The oscillator signal generators each operate asynchronously at frequencies above the frequency of the clock signal. The lowest output frequency of any particular oscillator is typically more than two times the frequency of the digital noise clock signal applied to the CK input 25. The frequency of each oscillator signal generator is relatively stable but circuit performance is not degraded by oscillator drift of several percent. Oscillator frequencies for the oscillators can be chosen using the following rules:

1. The lowest oscillator frequency should be 10 to 20 times the maximum digital noise clock frequency.

2. The highest oscillator frequency should be 100 to 200 times the maximum digital noise clock frequency.

3. The intermediate frequencies are selected in a non-linear separation manner in one of the two methods.
   A. The first method is to separate the lower two oscillator frequencies by a large amount and then decrease this frequency separation with each subsequent higher oscillator frequency.
   B. The second method is to separate the highest two oscillator frequencies by a large amount and decrease this frequency separation with each subsequent lower oscillator frequency.

4. All periods of the oscillator frequencies must not be rational numbers.

FIG. 2 is a logic diagram of a typical oscillator signal generator circuit 32. The frequency of this circuit is related to the propagation delay time of a logical single change of state through any particular gate such as NAND gate 100 or inverter 110.

The output of NAND gate 100 assumes a low state, or logic 0 only if the logic signal to both inputs 102 and 104 are high. Switching the PWR-ON enable signal at input 102 to a low state, such as ground forces the NAND gate output terminal 106 to be high at all times, thereby stopping operation of the oscillator signal generator. Allowing the logic level of the PWR-ON ENABLE signal to input 102 to go high, or be true, allows NAND gate 100 to operate as an inverter in response to the logic signal applied to input 104. The PWR-ON ENABLE function of switch 150 can be provided by a logic term from a system using the invention circuit 10.

RING OSCILLATOR OPERATION

First, assume that the PWR-ON ENABLE switch 150 is closed and that the signal level to input 104 is high and stable. Opening switch 150 allows the PWR-ON ENABLE signal to input 102 to go high. The signal at output terminal 106 immediately translates from a high to a low state. The low signal at terminal 106 is coupled to input 111 of inverter 110 and propagates through inverter 110 to produce a high signal at 112. The high signal at 112 is coupled to input 113 n propagates through inverter 120 to produce a low signal at 114. The low signal at 114 is coupled to input 115 and propagates through inverter 130 to produce a high signal at 116. The high signal at 116 is coupled to input 117 and propagates through inverter 140 to produce a low at terminal 121 which is coupled to NAND gate input 104. Since the logic signal to input 102 is high and since the logic signal to input 104 is now low, the output of NAND gate 120 at terminal 106 goes high. The reversal of the state of the signal at terminal 106 initiates a reversal of the state of signals at 112, 114, 116 and finally, 121 and back to input terminal 104, resulting in a transition of the state of the logic signal at 106 from a high initially to a low and then back to a high state. This oscillator process continues until the logic signal into the PWR-ON ENABLE input terminal 102 is switched to ground by closing switch 150 or by operation of an externally supplied control signal from a system.

The ring oscillator of FIG. 2 operates because there is an odd number of inversion stages. The frequency of this oscillator can be reduced by adding additional pairs of inverters or by inserting one or more delay circuits, such as a resistor and a capacitor network shown in FIG. 2a.

A typical RC network would couple the output terminal of one inverter, such as at 116 to the input of a subsequent inverter, such as at 117, in place of the shown connection, via a resistor, such as 135 and also couples a capacitor 145 between inverter input 117 and ground. The time required to charge the capacitor, and to discharge the capacitor results in a reduction of the output frequency of the oscillator generator circuit.

The output frequency of the ring oscillator of FIG. 2 is increased by reducing the number of inverter stages such as 110, 120, 130 and is increased by increasing the number of inverter stages.

Figure 3:
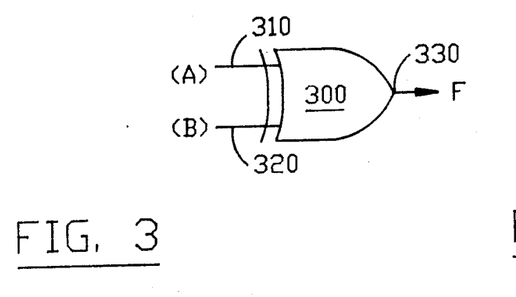
FIG. 3 is a logic diagram of a Two Input EXCLUSIVE-OR network and its associated VEITCH diagram.
Figure 3A:
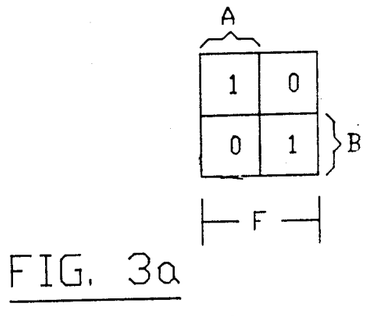

FIG. 3 shows an EXCLUSIVE-OR network means having a single EXCLUSIVE-OR gate. The circuits of FIGS. 3, 4, 5, 6, 7, 8, 9 and 10 are meant to represent alternative embodiments of EXCLUSIVE-OR network, EXCLUSIVE-NOR network means and for substitution with the functional block 20 of FIG. 1. This gate of FIG. 3 has first and second input terminals 310, 320 and an output terminal 330. The first input terminal 310 is coupled to the first oscillator output terminal, such as OSC1, 31 and the second input terminal 320 is coupled to the second oscillator terminal OSC2, 32. The EXCLUSIVE-OR network means output terminal 330 is coupled to the flip-flop input terminal 19. The accompanying VEITCH diagram for signal F1 at output terminal 330 shows that the output signal F1 changes its state for the state change of any single input variable A, or B.

Figure 4:
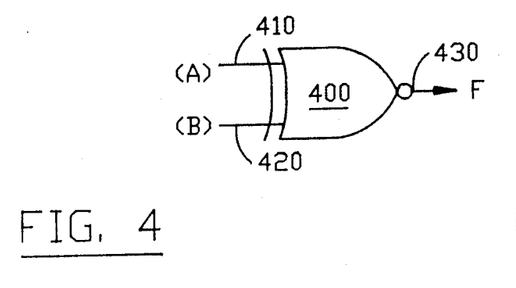
FIG. 4 is a logic diagram of a Two Input EXCLUSIVE-NOR network and its associated VEITCH diagram.
Figure 4A:
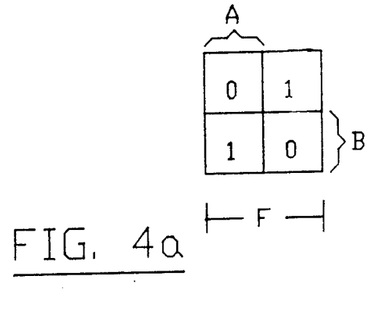

FIG. 4 shows an EXCLUSIVE-NOR network means having a single EXCLUSIVE-NOR gate. This gate has first and second input terminals 410, 420 and an output terminal 430. When substituted for functional block 20 of FIG. 1, the first input terminal 410 is coupled to the first oscillator output terminal, such as OSC1, 31 and the second input terminal 420 is coupled to the second oscillator terminal OSC2, 32. The EXCLUSIVE-NOR network means output terminal 430 is coupled to the flip-flop input terminal 19. The accompanying VEITCH diagram for signal F at output terminal 430 shows that the output signal F changes its state for the state change of any single input variable A, or B.

Figures 5, 5A:
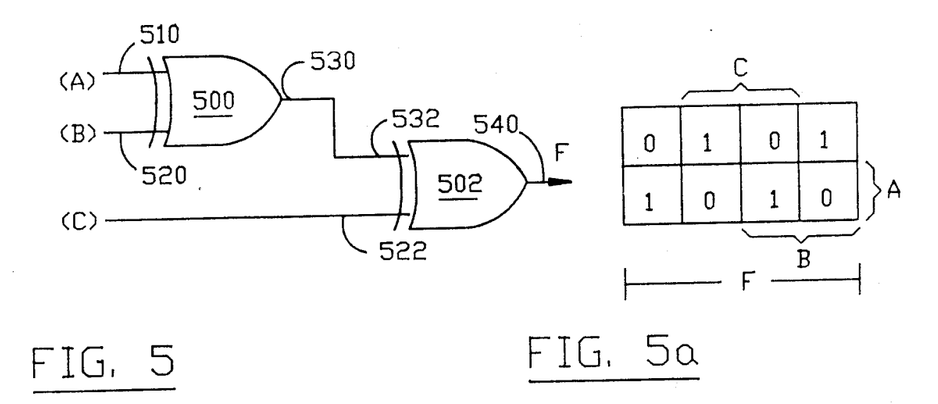
FIG. 5 is a logic diagram of a Three Input EXCLUSIVE-OR network and its associated VEITCH diagram.

FIG. 5 shows a typical EXCLUSIVE-OR network having a first and second EXCLUSIVE-OR gate 500, 502 and having first, second and third oscillator input terminals 510, 520, 522. The EXCLUSIVE-OR 500, 502 are Two Input Positive EXCLUSIVE-OR gates equivalent to components such as SN74AS86. When this alternative embodiment is substituted for functional block 20 in FIG. 1, the first input terminal 510 is coupled to the OSC1 oscillator signal generator output terminal, such as 31. The first EXCLUSIVE-OR gate second input terminal 520 is coupled to the OSC2 oscillator signal generator output terminal, such as 33. The second EXCLUSIVE-OR gate 502 second input terminal 526 is connected to the OCS3 oscillator signal generator output terminal, etc. The second EXCLUSIVE-OR gate first input terminal 532 is connected to the first EXCLUSIVE-OR gate output terminal 530 and the second EXCLUSIVE-OR gate output terminal 540 is coupled to the flip-flop input terminal 19.

The accompanying VEITCH diagram in FIG. 5 relates the logic state of the random output signal at F output terminal 540 as a function of the logic states of the three oscillator output signals shown as inputs to FIG. 5 in parenthesis as (A) (B) and (C).

Figures 6, 6A:
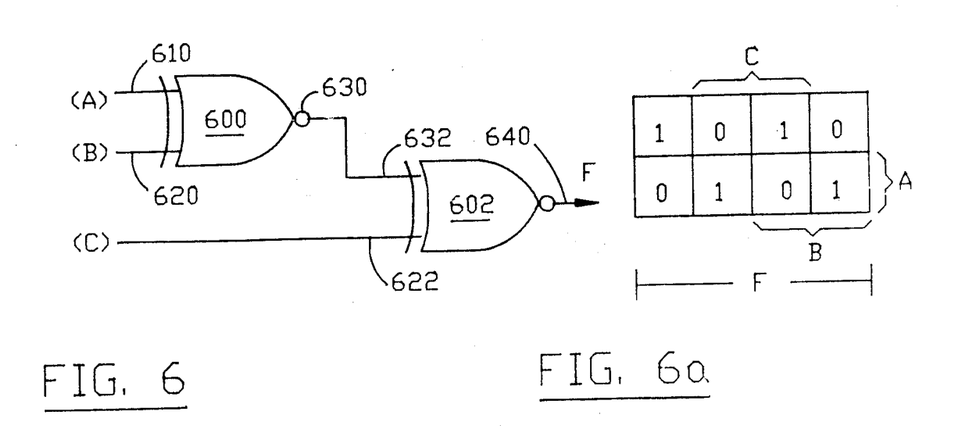
FIG. 6 is a logic diagram of a Three Input EXCLUSIVE-NOR network and its associated VEITCH diagram.

FIG. 6 shows a typical EXCLUSIVE-NOR network having a first and second EXCLUSIVE-NOR gate 600, 602 and having a first, second and third oscillator input terminals (A), (B) and (C). The EXCLUSIVE-NOR gates shown 600, 602 are Two Input Positive EXCLUSIVE-NOR gates equivalent to components such as 74LS266. The first EXCLUSIVE-NOR gate first input terminal 610 is coupled to the OSC1 oscillator signal generator output terminal, such as 31. The first EXCLUSIVE-NOR gate second input terminal 620 is coupled to the OSC2 oscillator signal generator output terminal, such as 33. The second EXCLUSIVE-NOR gate 602 second input terminal 622 is connected to the OSC3 oscillator signal generator output terminal, etc. The second EXCLUSIVE-NOR gate first input terminal 632 is connected to the first EXCLUSIVE-NOR gate output terminal 630 and the second EXCLUSIVE-NOR gate output terminal 640 is coupled to the flip-flop input terminal 19.

The accompanying VEITCH diagram in FIG. 6 relates the logic state of the random output signal F at output terminal 640 as a function of the logic states of the three oscillator output signals shown in parenthesis as (A) (B) and (C).

Figure 7:
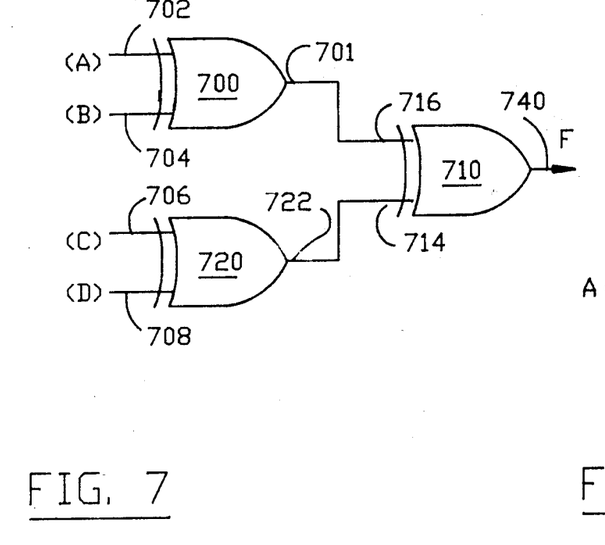
FIG. 7 is a logic diagram of a Four Input EXCLUSIVE-OR network and its associated VEITCH diagram.
Figure 7A:
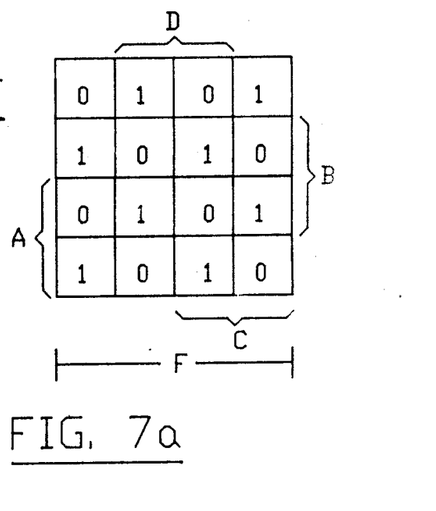

FIG. 7 shows a typical EXCLUSIVE-OR network having a first, second and third EXCLUSIVE-OR gate 700, 710, and 720 having first, second, third and fourth oscillator input terminals 702, 704, 706, 708. The EXCLUSIVE-OR gates 700, 710, 720 are Two Input Positive EXCLUSIVE-OR gates equivalent to components such as SN74AS86. This alternative embodiment is optionally substituted for functional block 20 in FIG. 1. The first EXCLUSIVE-OR gate input terminal 702 is coupled to the OSC1 oscillator signal generator output terminal, such as 31.

The first EXCLUSIVE-OR gate, second input terminal 704 is coupled to the OSC2 oscillator signal generator output terminal, such as 33. The second EXCLUSIVE-OR gate 710 second input terminal 714 is connected to the third EXCLUSIVE-OR gate output terminal 722 OSC3 oscillator signal generator output terminal.

The second EXCLUSIVE-OR gate first input terminal 716 is connected to the first EXCLUSIVE-OR gate output terminal 701 and the second EXCLUSIVE-OR gate output terminal 740 is coupled to the flip-flop input terminal 19.

The third EXCLUSIVE-OR gate first input terminal 706 is coupled to the OSC3 oscillator signal generator output terminal and the third EXCLUSIVE-OR gate second input terminal 708 is coupled to the OSC4 oscillator signal generator output terminal.

The accompanying VEITCH diagram in FIG. 7 relates the logic state of the random output signal at F output terminal 740 as a function of the logic states of the three oscillator output signals shown as inputs to FIG. 7 in parenthesis as (A), (B), (C) and (D).

Figure 8:
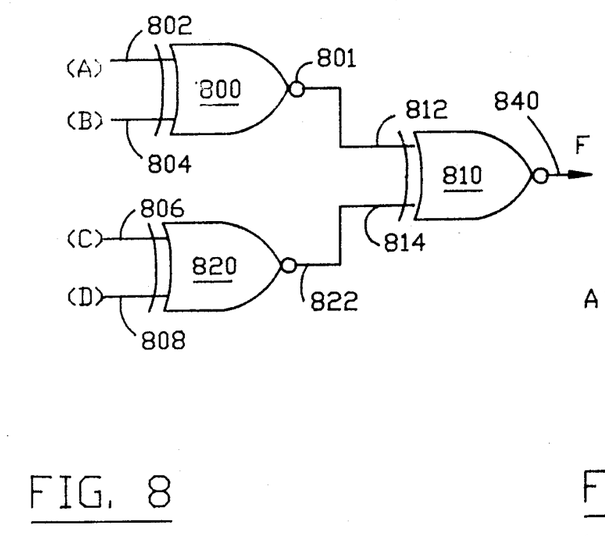
FIG. 8 is a logic diagram of a Four Input EXCLUSIVE-NOR network and its associated VEITCH diagram.
Figure 8A:
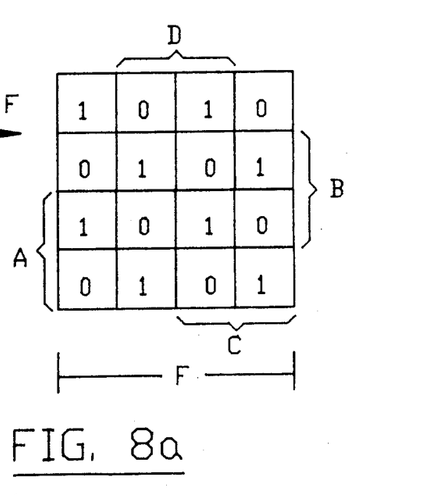

FIG. 8 shows a typical EXCLUSIVE-NOR network having a first, second and third EXCLUSIVE-NOR gate 800, 810, and 820 having first, second, third and fourth oscillator input terminals 802, 804, 806, 808. The EXCLUSIVE-NOR gates 800, 810, 820 are Two Input Positive EXCLUSIVE-NOR gates equivalent to components such as SN74AS266. This alternative embodiment is optionally substituted for functional block 20 in FIG. 1. The first EXCLUSIVE-NOR gate input terminal 802 is coupled to the OSC1 oscillator signal generator output terminal, such as 31.

The first EXCLUSIVE-NOR gate, second input terminal 804 is coupled to the OSC2 oscillator signal generator output terminal, such as 33. The second EXCLUSIVE-NOR gate 810 second input terminal 814 is connected to the third EXCLUSIVE-NOR gate output terminal 822 OSC3 oscillator signal generator output terminal.

The second EXCLUSIVE-NOR gate first input terminal 812 is connected to the first EXCLUSIVE-NOR gate output terminal 801 and the second EXCLUSIVE-NOR gate output terminal 840 is coupled to the flip-flop input terminal 19.

The third EXCLUSIVE-NOR gate first input terminal 806 is coupled to the OSC3 oscillator signal generator output terminal and the third EXCLUSIVE-NOR gate second input terminal 808 is coupled to the OSC4 oscillator signal generator output terminal.

The accompanying VEITCH diagram in FIG. 8 relates the logic state of the random output signal at F output terminal 840 as a function of the logic states of the three oscillator output signals shown as inputs to FIG. 8 in parenthesis as (A), (B), (C) and (D).

Figure 9:
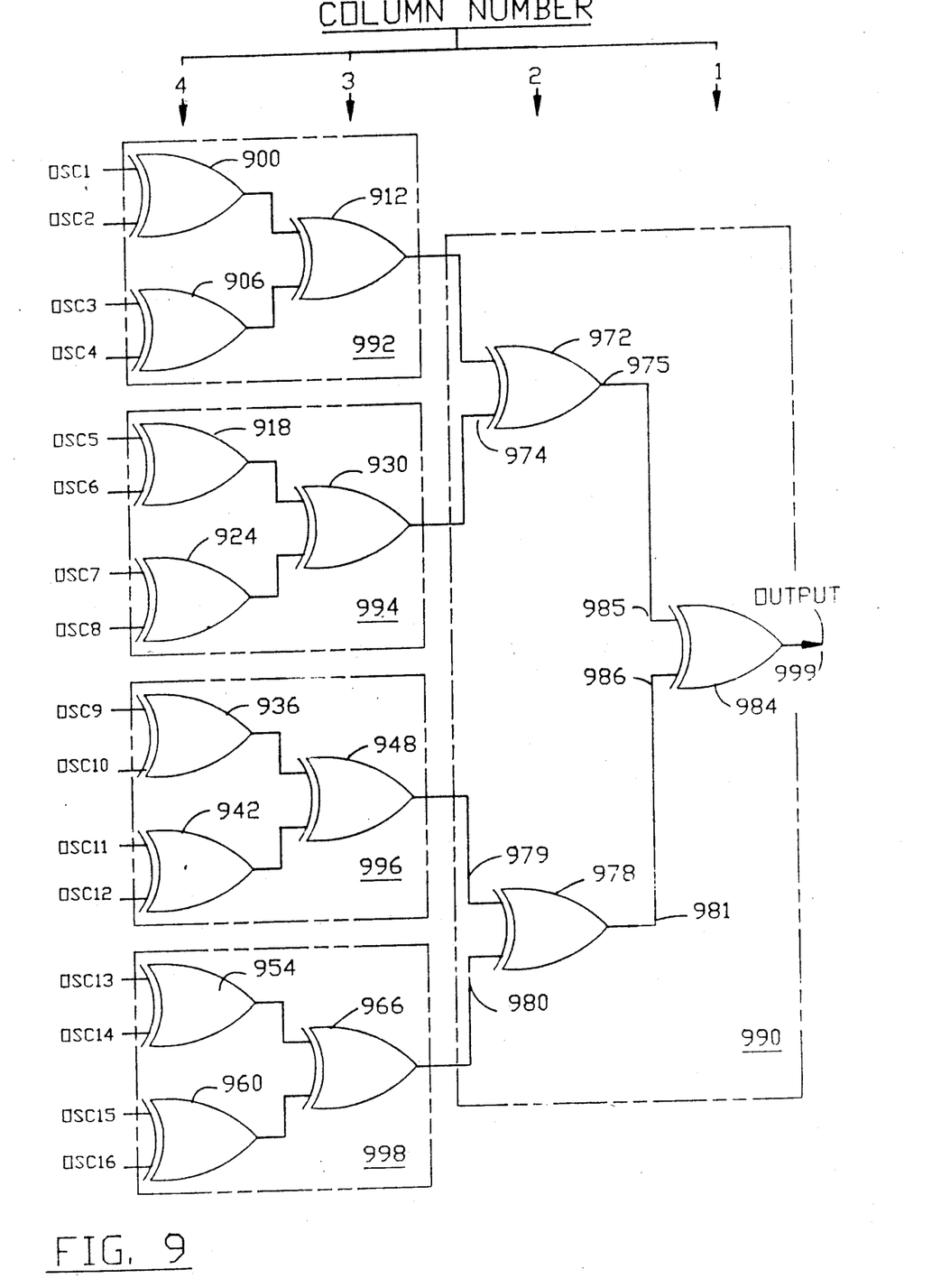
FIG. 9 is a logic diagram of a Sixteen Input Tree EXCLUSIVE-OR network means.

FIG. 9 shows a preferred embodiment of the network means having an array of Sixteen Input Terminals, each input terminal being coupled to the output terminal of a corresponding oscillator signal generator output terminal. These oscillator output terminals are designated OSC1 . . . OSC16, inclusive. This network means has Fifteen Two Input positive EXCLUSIVE-OR gates 900, 906, 912, 918, 924, 930, 936, 942, 948, 954, 960, 966, 972, 978 and 984. The network means of FIG. 9 is also characterized to complement the network means output at output terminal 999 with the simultaneous change of state of any odd number of oscillator generator output signals, such as at OSC1 . . . OSC16. When the network means of FIG. 9 is substituted for functional block 20 in FIG. 1, the network means output terminal 999 is coupled to the flip-flop input terminal 19.

Since each of the oscillators providing signals to the network means are operating asynchronously, there is no assurance that only one oscillator will be changing state at any particular time or that any pair of oscillator inputs to the network means will be changing state with a predetermined separation in time. As a consequence of this uncertainty, output changes at the network means output terminal at output terminal 999 have no assured minimum duty interval. There is no assurance that the output signal at output terminal 999 will complete each and every transition from a first state to a second state or from a second state to a first state. Partial transitions of the output signal at output terminal 999 are expected and will be observed to occur.

Figure 10:
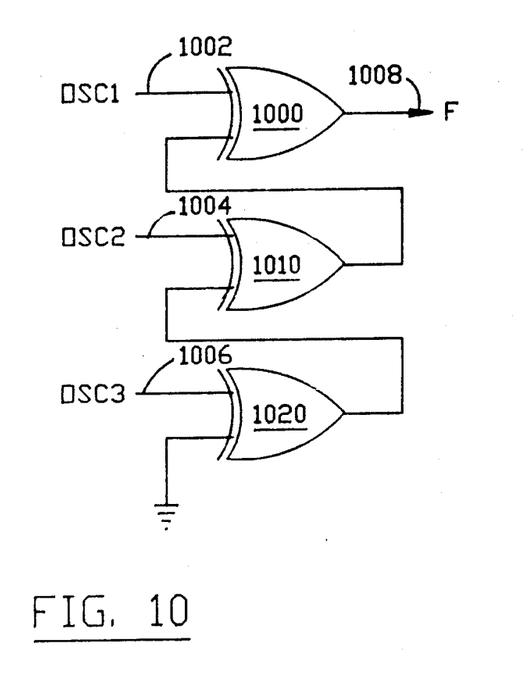
FIG. 10 is a logic diagram of a Three Input Series EXCLUSIVE-OR network means.
Figure 10A:
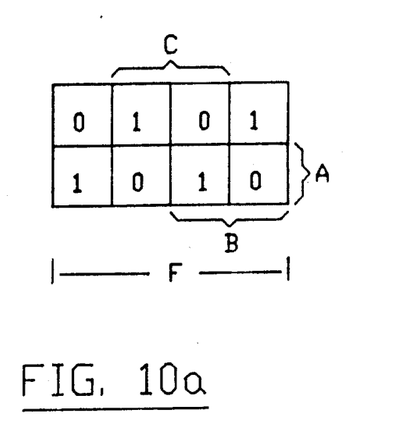

FIG. 10 characterizes another alternative embodiment of a circuit for substitution as a network means for functional block 20 within FIG. 1. The circuit of FIG. 9 has an array of input terminals 1002, 1004 and 1006. Each input terminal is coupled to the output terminal of a corresponding oscillator signal generator output terminal, such as 31, 33 and 35. The output terminal of FIG. 10 is a random output signal having a first and second state. The network means of FIG. 10 is further characterized to complement the network means output signal F at output terminal 1008 with the simultaneous change of state of any odd number of oscillator generator output signals. The network means output terminal 1008 is coupled to the flip-flop input terminal 19. The accompanying VEITCH diagram of FIG. 10 characterizes the functional relationship between output signal F and the respective input signals (A), (B) and (C).

It should be observed that the EXCLUSIVE-OR gates of FIG. 10 form a series array of EXCLUSIVE-OR gates. Complementary operation is obtained by substituting EXCLUSIVE-NOR gates for each of the EXCLUSIVE-OR gates in FIG. 10. Each cell within the accompanying VEITCH diagram for FIG. 10 is complemented to characterize the output state of signal F for a network means fabricated in accordance with the schematic of FIG. 10 but using EXCLUSIVE-NOR instead of EXCLUSIVE-OR gates.

Figure 11:
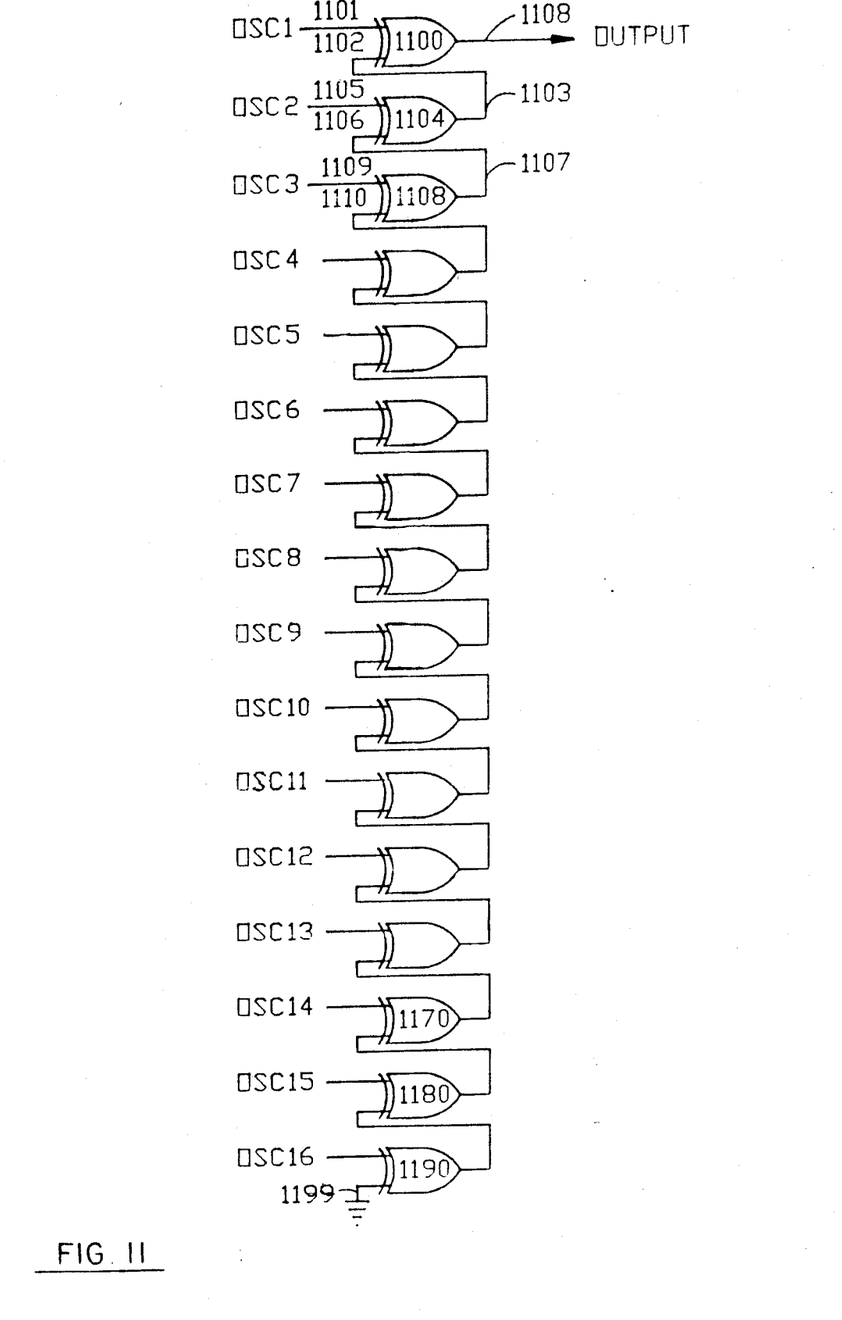
FIG. 11 is a logic diagram of a Sixteen Input Series EXCLUSIVE-OR network means.

FIG. 11 characterizes another alternative circuit for use as a network means within functional block 20 of FIG. 1. The network means circuit of FIG. 11 characterizes a network means circuit that provides inputs for up to 16 oscillator signal generator output operating at different frequencies, each oscillator signal generator having an output terminal and providing a periodic output signal at its respective output terminal.

The network means circuit of FIG. 11 suggests that a network means circuit can be fabricated having N Two Input EXCLUSIVE-OR gates such as EXCLUSIVE-OR gates 1100, 1104, 1108, ..., each EXCLUSIVE-OR gate having an output terminal. The output terminal 1108 of the first EXCLUSIVE-OR gate 1100 is coupled to the flip-flop input terminal 19. The first input terminal of each EXCLUSIVE-OR gate, such as 1101, 1105, 1109, ... is coupled to the output terminal of a respective oscillator generator, such as OSC1, OSC2, OSC3, OSC.... The second input of the Nth EXCLUSIVE-OR gate 1190 is coupled to ground and the output of each EXCLUSIVE-OR gate, with the exception of the first EXCLUSIVE-OR gate 1100, is coupled to the second input of the next consecutive EXCLUSIVE-OR gate. For example, the third EXCLUSIVE-OR gate 1108 output terminal 1107 is connected to the second input 1106 of the second EXCLUSIVE-OR gate 1104. As with previously described alternative embodiments, EXCLUSIVE-NOR gates may be substituted for EXCLUSIVE-OR gates.

The alternative embodiments of FIGS. 10 and 11 require that the signal transition from a higher order gate, such as the Sixteenth gate 1190 in FIG. 11, propagate through each next lower order gate, such as the Fifteenth gate 1180 and the Fourtheenth gate 1170 to ultimately reach the output at output terminal 1108. The time required to propagate a signal through N gates is the total of N propagation delay times. This fact suggests that the topology characterized by the series array circuits of FIG. 10 and FIG. 11 have a bandwidth or granularity limitation that is avoided by the topology of circuit of FIG. 9.

FIG. 9 is characterized as a triangular array of columns of Two Input EXCLUSIVE-OR gates. Gate 984 represents a first column having a single gate. Gates 972 and 978 represent a second column having two gates. Gates 912, 930, 948 and 966 represent a third column having four gates, etc.

In the network means embodiment of FIG. 9, the first column has a single EXCLUSIVE-OR gate 984 that has its output terminal coupled to the flip-flop input terminal 19 (not shown). Each successive column of gates has $2^{N-1}$ gates, i.e., the second column has two gates, the third column has four gates and the fourth column as eight gates. The value of N for each successive column of gates varies as an increasing integer series commencing with 1 and rising to N to characterize the number of columns. The value of N varies from 0 to $N-1$ to characterize the number of gates in any column N. Thus, for example, the third column for which $N=3$ has $2^{(3-1)}=4$ gates. The column having the largest number of gates, i.e. the Nth column, has 2Nth input terminals. The input terminals of each column are coupled to the respective output terminals of the next higher order column. Thus, the input terminals to the first column 985, 986 are coupled to the output terminals of the next higher order column, i.e. the second column output terminals 975, 981. A network means circuit having a triangular array of N columns requires 2Nth oscillator signal generators. Each oscillator signal generator operates at a difference frequency and has an output terminal, such as 31, 33. Each oscillator signal generator provides a periodic output signal at its respective output terminal and each oscillator output terminal is coupled to respective input terminal of those gates in the Nth or highest order column. The network means thus described and characterized by FIG. 9 complements the network means output signal with the simultaneous change of state of any odd number of oscillator generator output signals, such as OSC1, OSC2, OSC3 ...

Phantom blocks 992, 994, 996, 998 and 990 chracterize circuit topologies characterized by the circuit of FIG. 7.

The invention monolithic random digital noise generator circuit of FIG. 1 is particularly suited for fabrication and use in MOS/LSI devices as a random number generator using a plurality of ring oscillator circuits such as the circuit of FIG. 2 in cooperation with network means circuits such as those characterized by the circuits of FIGS. 9 and 11. The bandwidth required, process limitations and efficiency of circuit layout for particular sub topologies, such as the topology of FIG. 7 vs. the topology of FIG. 10 and the topology of FIG. 9 vs. the topology of FIG. 11 will dictate the topology to be selected for a particular application.

The function of an EXCLUSIVE-OR gate and the function of an EXCLUSIVE-NOR gate can be provided by operation of a microprocessor program monitoring discrete inputs. The foregoing description of the invention circuit suggests that a comparable function can be implemented using a microprocessor adapted to monitor discrete inputs, each of which is coupled to as asynchronous oscillator. The EXCLUSIVE-OR or EXCLUSIVE-NOR gates required to implement the topologies of FIGS. 3 through and including 11 could then be implemented by the microprocessor via software and a looping program for the purpose of providing a series of random numbers.

Figure 12:
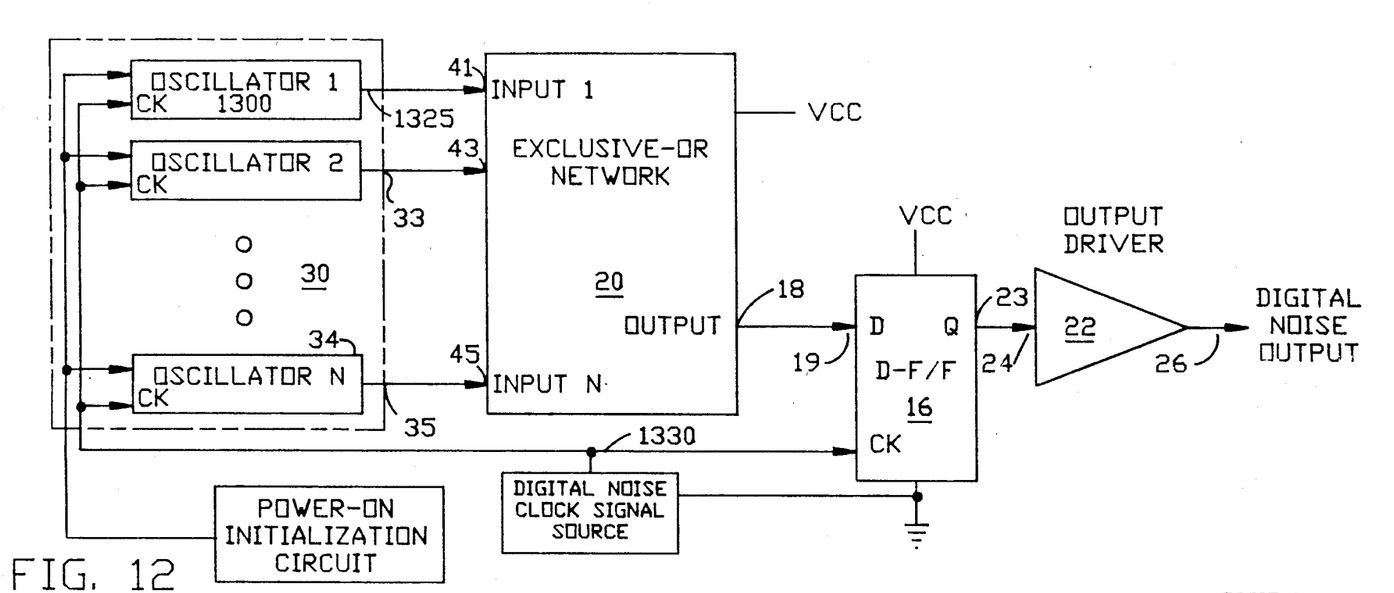
FIG. 12 is a block diagram of the invention random digital signal generator with clocked output oscillators.

FIG. 12 represents a modified version of FIG. 1 in which each oscillator signal generator is shown being sourced with a common clock signal from the digital noise clock source output 1330.

Figure 13:
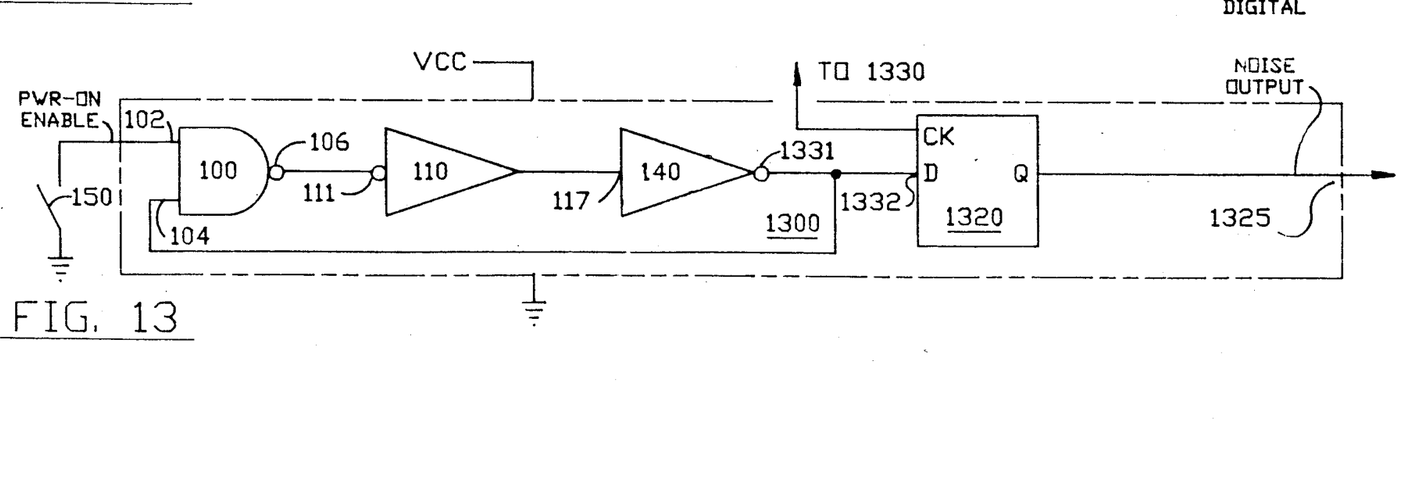
FIG. 13 is a logic diagram of a clocked output ring oscillator.

FIG. 13 characterizes a typical oscillator signal generator 1300 having a clocked output. The clocked output is obtained by coupling the ring oscillator output terminal 1331 to the input of flip-flop 1320. Each oscillator signal generator has a ring oscillator feeding the input of a respective flip-flop. Each flip-flop within each oscillator signal generator has an input terminal 1332 and an output terminal such as 1325. The output terminal 1331 of the ring oscillator signal generator 1331 is coupled to the input terminal 1332 of flip-flop 1320. The flip-flop 1320 provides a signal at its output terminal 1325 that has a value corresponding to the state of the input signal at input terminal 1332 concurrent with a change of state of the clock signal at clock signal source 1330 until a subsequent clock signal is received. Although the output of the ring oscillator signal generator at terminal 1331 is periodic, the output of flip-flop 1320 at output terminal 1325 will not be periodic. The output signal at flip-flop output terminal 1325 will assume random values of 1 or 0 with each clock pulse.

Clocking the output of each oscillator to a respective input of the EXCLUSIVE-OR network allows the EXCLUSIVE-OR network to function with a lower bandwidth capability. Random changes within the EXCLUSIVE-OR network are avoided other than precisely at clock time. The propagation of all logic level changes through the EXCLUSIVE-OR gate has a full clock cycle to be completed.

The period of each oscillator frequency must be an irrational number, i.e. no frequence period shall be a multiple of any other frequency period. An irrational number is defined as an infinite decimal with no set of consecutive digits repeating itself indefinitely and that can not be expressed as the quotient of two integers.

The use of rotational period valves, where one frequency period is a multiple of another frequency period, will reduce the randomness of the output signal by allowing a cyclic repetition of output signals from the two related oscillators. If all oscillators are related to each other by rational frequency periods, the output signal is periodic and therefor not random.

For example, a system having four oscillators with periods of 10.0, 5.0, 2.0 and 1.0 exact microseconds will have a repetitive pattern every 10 microseconds. Also, four oscillators with periods of 10.0, 5.0, 3.0, and 2.0 exact microseconds will have a repetitive pattern every 30 microseconds. However, four oscillators with frequencies of 10.1249768 . . . , 4.8765 . . . , 2.198753 . . . , and 0.9763285 . . . microseconds will not repeat at all, if the period value has essentially infinite decimals.

Several systems have been fabricated and treated in which the number of oscillators used and their respective frequencies were established by empirical means. Typically, useful results were obtained using between eight and twelve oscillators. By useful we mean, obtaining numerical results equal to or better than the results obtainable via a diode reference noise source. Oscillator frequencies selected for use in this test class of system were in the range of from 10.0 to 150 MHz.

The output of a particular embodiment is evaluated by forming sixty-four (64) bit binary numbers from the clocked pulse output train at terminal 26 of FIG. 1. These 64-bit numbers are evaluated for randomness or unpredictability by the following process. Each bit within each series of 64-bits has an equal probability of being a one or a zero.

A sequence of a large number of numbers, each having 64-bits, are recorded. The number of ones and zeros in each number are each totaled. The total number of ones should equal the total number of zeros for a large sample.

In an alternative test method, the output of the invention random digital noise generator is fed to the input of a spectrum analyzer such as a Hewlett Packard 8566A Spectrum Analyzer. The frequency components of the signal train from a system using a 100 KHz clock reference and having between 9 and 15 oscillators is conveniently verified to be relatively flat over a frequency range of from 10 KHz to 500 MHz.

What is claimed is:

1. A random digital signal generator circuit responsive to a clock signal from a clock signal source for outputting a sequential series of logic signals, each logic signal having at least a high and a low state at an output terminal comprising:

a flip-flop having a clock signal input terminal responsive to said clock signal, said flip-flop also having an input and output terminal and being further characterized to store the state of a signal at said input terminal and to provide a signal at said output terminal having a value corresponding to the state of the input signal concurrent with the clock signal until a subsequent clock signal is received in response to a clock signal;

an array of oscillator signal generators, each successive oscillator signal generator operating at a different frequency and having an output terminal and providing a periodic output signal at its respective output terminal, each respective oscillator signal generator operating asynchronously at a frequency above the frequency of said clock signal; the period of each oscillator frequency being further characterized to be different from each other within a predetermined range and selected to obtain an irrational value for the period of each oscillator frequency;

an EXCLUSIVE-OR network means having an array of input terminals, each input terminal being coupled to the output terminal of a corresponding oscillator signal generator output terminal, for providing a random output signal at an output terminal, said EXCLUSIVE-OR means output terminal being coupled to said flip-flop input terminal;

whereby, said flip-flop responds to each said clock signal to sample the state of the random output signal at said flip-flop input terminal and to store and couple the state of said random output signal to said flip-flop output terminal until the next subsequent clock signal.

2. The random digital signal generator circuit of claim 1 wherein said EXCLUSIVE-OR network means further comprises:

a first EXCLUSIVE-OR gate having a first and second input and an output terminal, said first input terminal being coupled to said first oscillator output terminal and said second input terminal being coupled to said second oscillator terminal, said NOR gate output terminal being coupled to said flip-flop input terminal.

3. The random digital signal generator circuit of claim 2 wherein said EXCLUSIVE-OR network means further comprises:

a third oscillator; and a second EXCLUSIVE-OR gate having a first and second input and an output terminal, said second EXCLUSIVE-OR gate first input terminal being coupled to the output terminal of said first EXCLUSIVE-OR gate, said second EXCLUSIVE-OR gate second input terminal being coupled to said third oscillator signal generator output terminal and said EXCLUSIVE-OR gate output terminal being coupled to said flip-flop input terminal.

4. The random digital signal generator circuit of claim 3 wherein said EXCLUSIVE-OR network means further comprises:

a fourth oscillator signal generator; and a third EXCLUSIVE-OR gate having a first and second input and an output terminal, the first input terminal of said second EXCLUSIVE-OR gate being coupled to the output terminal of said first EXCLUSIVE-OR gate, the second input of said second EXCLUSIVE-OR gate being coupled to the output terminal of said third EXCLUSIVE-OR gate, the first and second input terminals of said third EXCLUSIVE-OR gate being coupled to the respective output terminal of said respective third and fourth oscillator signal generators.

5. The random digital signal generator circuit of claim 1 wherein each oscillator signal generator is a ring oscillator.

6. The random digital signal generator circuit of claim 4 wherein each oscillator signal generator is a ring oscillator.

7. A random digital signal generator circuit responsive to a clock signal at a clock frequency from a clock signal source for outputting a sequential series of logic signals, each logic signal having at least a high and low state at an output terminal comprising:

a flip-flop having a clock signal input terminal responsive to said clock signal, said flip-flop also having an input and output terminal and being further characterized to store the state of a signal at said input terminal and to provide a signal at said output terminal having a value corresponding to the state of the input signal concurrent with a change of state of said clock signal until a subsequent clock signal change of state is received;

an array of oscillator signal generators, each successive oscillator signal generator operating at a successively higher frequency above said clock frequency, each frequency having a predetermined value, each oscillator signal generator having an output terminal, the period of each oscillator frequency being further characterized to be different from each other within a predetermined range and selected to obtain an irrational value for the period of each oscillator frequency; each oscillator signal generator providing a periodic output signal at its respective output terminal;

an EXCLUSIVE-NOR network means having an output terminal and an array of input terminals, each input terminal being coupled to the output terminal of a corresponding oscillator signal generator output terminal, for providing a random output signal at said EXCLUSIVE-NOR network means output terminal, said EXCLUSIVE-NOR means output terminal being coupled to said flip-flop input terminal;

whereby, said flip-flop responds to each said clock signal change of state to sample and store the state of the random output signal at said flip-flop input terminal and to couple the stored state of said random output signal to said flip-flop output terminal until the next subsequent clock signal change of state.

8. The random digital signal generator circuit of claim 7 wherein said EXCLUSIVE-NOR network means further comprises:

at least a first, a second, a third and a fourth oscillator signal generator and a first, a second and a third EXCLUSIVE-NOR gate, each respective EXCLUSIVE-NOR gate having a first and second input and an output terminal, the output terminal of said second EXCLUSIVE-NOR gate being coupled to said flip-flop input terminal, the first input terminal of said second EXCLUSIVE-NOR gate being coupled to the output terminal of said first EXCLUSIVE-NOR gate, the second input of said second EXCLUSIVE-NOR gate being coupled to the output terminal of said third EXCLUSIVE-NOR gate and the first and second input terminals of said first and third EXCLUSIVE-NOR gates each being coupled to a single output terminal of said first, second, third and fourth oscillator signal generators.

9. A random digital signal generator circuit responsive to a clock signal at a clock frequency from a block signal source for outputting a sequential series of logic signals, each logic signal having at least a high and a low state at an output terminal comprising:

a flip-flop having a clock signal input terminal responsive to said clock signal, said flip-flop also having an input and output terminal and being further characterized to store the state of a signal at said input terminal and to provide a signal at said output terminal having a value corresponding to the state of the input signal concurrent with a clock signal change of state until a subsequent clock signal change of state is received;

an array of oscillator signal generators, each successive oscillator signal generator operating asynchronously at a successively higher frequency above said clock frequency and having an output terminal and providing a periodic output signal at its respective output terminal, and wherein the period of each oscillator frequency is further characterized to be different from each other within a predetermined range selected to obtain an irrational value for the period of each oscillator frequency period;

a network means having an an array of input terminals, each input terminal being coupled to the output terminal of a corresponding oscillator signal generator output terminal, for providing a random output signal having a first and second state;

said network means being further characterized to complement said network means output signal with the simultaneous change of state of any odd number of oscillator generator output signals, said network means output terminal being coupled to said flip-flop input terminal;

whereby, said flip-flop responds to each said clock signal change of state to sample and store the state of the random output signal at said flip-flop input terminal and to couple the stored state of said random output signal to said flip-flop output terminal until the next subsequent clock signal change of state.

10. The random digital signal generator circuit of claim 9 wherein said network means further comprises:
at least a first, a second, a third and a fourth oscillator signal generator and a first, a second and a third EXCLUSIVE-OR gate, each respective EXCLUSIVE-OR gate having a first and second input and an output terminal, the output terminal of said second EXCLUSIVE-OR gate being coupled to said flip-flop input terminal, the first input terminal of said second EXCLUSIVE-OR gate being coupled to the output terminal of said first EXCLUSIVE-OR gate, the second input of said second EXCLUSIVE-OR gate being coupled to the output terminal of said third EXCLUSIVE-OR gate and the first and second input terminals of said first and third EXCLUSIVE-OR gates each being coupled to a single output terminal of said first, second, third and fourth oscillator signal generators.

11. The random digital signal generator circuit of claim 9 wherein said network means further comprises:
at least a first, a second, a third and a fourth oscillator signal generator and a first, a second and a third EXCLUSIVE-NOR gate, each respective EXCLUSIVE-NOR gate having a first and second input and an output terminal, the output terminal of said second EXCLUSIVE-NOR gate being coupled to said flip-flop input terminal, the first input terminal of said second EXCLUSIVE-NOR gate being coupled to the output terminal of said first EXCLUSIVE-NOR gate, the second input of said second EXCLUSIVE-NOR gate being coupled to the output terminal of said third EXCLUSIVE-NOR gate and the first and second input terminals of said first and third EXCLUSIVE-NOR gates each being coupled to a single output terminal of said first, second, third and fourth oscillator signal generators.

12. The random digital signal generator circuit of claim 9 wherein said network means further comprises:
a series array of N two input EXCLUSIVE-OR gates where N is a positive integer series ranging from 1 to N, and wherein each EXCLUSIVE-OR gate has an output terminal, the output terminal of the first EXCLUSIVE-OR gate being coupled to the flip-flop input terminal;
the first input of each EXCLUSIVE-OR gate being coupled to the output terminal of a respective oscillator generator, the second input of the Nth EXCLUSIVE-OR gate being coupled to ground and the output of each EXCLUSIVE-OR gate with the exception of the first EXCLUSIVE-OR gate, being coupled to the second input of the next consecutive EXCLUSIVE-OR gate.

13. The random digital signal generator circuit of claim 9 wherein said network means further comprises:
a series array of N two input EXCLUSIVE-NOR gates where N is a positive integer series ranging from 1 to N, and wherein each EXCLUSIVE-NOR gate has an output terminal, the output terminal of the first EXCLUSIVE-NOR gate being coupled to the flip-flop input terminal;
the first input of each EXCLUSIVE-NOR gate being coupled to the output terminal of a respective oscillator generator, the second input of the Nth EXCLUSIVE-NOR gate being coupled to ground and the output of each EXCLUSIVE-NOR gate with the exception of the first EXCLUSIVE-NOR gate, being coupled to the second input of the next consecutive EXCLUSIVE-NOR gate.

14. The random digital signal generator circuit of claim 9 wherein said network means further comprising:
a triangular array of columns of two input EXCLUSIVE-OR gates, the first column having a single EXCLUSIVE-OR gate having its output terminal coupled to the flip-flop input terminal, and wherein each successive column of gates has $2^{(N-1)}$ gates, wherein for said network means, the value of N for each successive column of gates varies as an increasing integer series commencing with 1 and rising to N; the largest column of gates having $2^{Nth}$ input terminals; the input terminal of each column being coupled to the respective output terminals of the next higher order column; and
wherein said array of oscillator signal generators further comprises an array of $2^{Nth}$ oscillator signal generators, each oscillator signal generator operating at a different frequency and having an output terminal, each oscillator signal generator providing a periodic output signal at its respective output terminal; each oscillator output terminal being coupled to a respective input terminal of those gates in the highest order column;
said network means being further characterized to compliment said network means output signal with the simultaneous change of state of any odd number of oscillator generator output signals;
whereby, said flip-flop responds to each said clock signal to sample the state of the random output signal at said flip-flop input terminal and to store and coupled the state of said random output signal to said flip-flop output terminal until the next subsequent clock signal.

15. The random digital signal generator circuit of claim 1 wherein each oscillator signal generator further comprises:
a ring oscillator having an output terminal; and
an oscillator output flip-flop having a clock signal input terminal responsive to said clock signal, each said oscillator output flip-flop also having an input and output terminal, each said input terminal being coupled to a respective ring oscillator signal generator output terminal, and being further characterized to store the state of a signal at said oscillator output flip-flop input terminal and to provide a signal at said oscillator output flip-flop output terminal having a value corresponding to the state of the input signal concurrent with the clock signal until a subsequent clock signal is received; and wherein,
each input terminal of said EXCLUSIVE-OR network means is coupled to the output terminal of a corresponding oscillator output flip-flop.

16. An apparatus for providng random output signals comprising:
means for providing a plurality of periodic signals, each successive periodic signal having a first or second state at any instant in time, each successive periodic signal operating at a successively higher frequency, each said frequency being higher than a clock frequency, the period of each oscillator frequency being characterized to be different from each other within a predetermined range and selected to obtain an irrational value for the period of each oscillator frequency;

means for combining each said oscillator signal with an exclusive or circuit characterized to provide a random signal that changes its logic state state in response to the change of state of any odd number of said oscillator signals; and means for periodically sampling, storing and outputting the logic state of said random signal.

17. The method of providing a random output signal comprising the steps of:

providing a plurality of periodic oscillator signals, each successive periodic oscillator signal having a first or second state at any time, each periodic oscillator signal operating at a successively higher frequency above a clock signal, the period of each oscillator frequency being characterized to be different from each other within a predetermined range and selected to obtain an irrational value for the period of each oscillator frequency;

combining each said periodic oscillator signal with an exclusive or means for providing a random signal that changes state in response to the change of state of any odd number of said oscillator signals; and clocking a sampling means for storing the logic state of said random signal and for outputting said random signal.

* * * * *